United States Patent Office 3,140,232
Patented July 7, 1964

3,140,232
COLOR STABILIZATION OF TETRACYCLINE COMPOSITIONS WITH POLYPROPYLENE GLYCOLS
Melvin M. Noseworthy, Malverne, N.Y., assignor to Chas. Pfizer & Co., Inc., New York, N.Y., a corporation of Delaware
No Drawing. Filed Dec. 19, 1962, Ser. No. 245,677
12 Claims. (Cl. 167—65)

This invention relates to novel pharmaceutical compositions and more particularly to certain tetracycline-type antibiotic-containing compositions which posses enhanced color stability. It is also concerned with the process of purifying tetracycline-type antibiotics for such purposes.

As is well-known to those skilled in the art, pharmaceutical dosage forms containing the tetracycline-type antibiotics are particularly subject to oxidative decomposition when exposed to the air for even relatively short periods of time. This, in turn, results in the rapid formation of many highly colored body impurities which render said antibiotic dosage forms not only generally unattractive in appearance, but also ultimately unfit for their generally intended human use due to the resultant loss in potency which ensues. Accordingly, it is a primary object of the present invention to provide new therapeutic compositions which will not possess the aforementioned drawback. Another object of this invention is to provide new tetracycline-type antibiotic dosage forms which will not darken perceptibly when exposed to the air for even relatively long periods of time. A still further object of the invention is to provide a new method for purifying the tetracycline antibiotics, whereby an upgraded and highly crystalline product will be obtained which will be even more stable toward heat and light than was heretofore ever thought possible by those in the field. Other objects and advantages of the present invention will of course, become obvious to those skilled in the art to which it pertains from the description which follows.

In accordance with the present invention, the foregoing objects have now all been achieved by the rather surprising discovery that polypropylene glycols will considerably retard the aforesaid color darkening of the tetracycline-type antibiotic dosage forms when employed in conjunction with them as a pharmaceutically acceptable carrier therefor. In general, therefore, the novel compositions of this invention will comprise a tetracycline-type antibiotic as the essential active ingredient therein and a polypropylene glycol as the pharmaceutically acceptable carrier therefor, with the polypropylene glycol being preferably selected from the class of those pharmaceutically acceptable polypropylene glycols having an average molecular weight that is in the range from about 2200 up to about 8200. The advantages afforded by the use of such an invention should certainly be obvious from what has already been discussed, but some of the more salient features in this respect are nevertheless hereinafter presented to the reader for the sake of convenience and clarity. They are as follows: for instance, (1) tetracycline-type antibiotic dosage forms can now be obtained which will not darken perceptibly when exposed to the air for extended periods of time; (2) the component ingredients of the resulting compositions are all safe and effective for human use, as well as for use in animals (in the form of veterinary compositions); and lastly, (3) these compositions still possess the requisite biological stability properties.

In connection with a more detailed consideration of this invention, the tetracycline-type antibiotic component, also referred to as a tetracycline antibiotic, may be any one of the hereinafter indicated members of the biologically active group of perhydronaphthacene derivates disclosed in U.S. Patent No. 3,026,248, such as chlortetracycline, tetracycline, oxytetracycline, 6-demethylchlortetracycline, 6-deoxytetracycline, 6-demethyl-6-deoxytetracycline, 6-demethyl-6-deoxy-7-bromotetracycline, and so forth. This would also include the coordination complexes which such antibiotics form with salts. For instance, in U.S. Patent No. 3,017,328, there are described the compounds which oxytetracycline will form with magnesium, calcium, aluminum and zinc, as well as the compounds which tetracycline will form with magnesium, calcium and aluminum. More particularly, the preferred complexes are the magnesium, calcium and aluminum complexes of tetracycline which have a molar ratio of metal ion to tetracycline that is about 3:1, and the magnesium, calcium, aluminum and zinc complexes of oxytetracycline which have a molar ratio of metal ion to oxytetracycline that is in the range of from about 1:3 up to about 3:1.

The polypropylene glycol component of these novel compositions is, of course, a pharmaceutically acceptable glycol and preferably one having an average molecular weight in the range of 2200–8200, as previously mentioned. These glycols (actually, polyols) are all members of a series of nonionic surface-active agents prepared by condensing ethylene oxide with a hydrophobic base formed by the condensation of propylene oxide with propylene glycol. The particular polypropylene glycols employed in this invention are all available commercially under the trademark name of "Pluronic" from the Wyandotte Chemicals Corporation of Wyandotte, Michigan, where the designation appearing after their name simply refers in a code-like way to their average molecular weight. Thus, for instance, Pluronic L44 is a polypropylene glycol of average molecular weight 2200; Pluronic L62, a polypropylene glycol of average molecular weight 2400; Pluronic L64, a polypropylene glycol of average molecular weight 2800; Pluronic P75, a polypropylene glycol of average molecular weight 4000; and Pluronic F68, a polypropylene glycol of average molecular weight 8200. In practice, other polyol solvents such as propylene glycol and polyethylene glycol may also be employ in conjunction with the instant polyols, if so desired, but they cannot be used alone (i.e., without the polypropylene glycol as in the prior art compositions) without sacrificing the enhanced color stability effect previous discussed. Preferred compositions of this invention include the tetracycline antibiotic-polypropylene glycol combinations which also contain polyethylene glycol at levels of up to about 65% by weight of their total composition or propylene glycol at levels of up to about 50% by weight of same.

Needless to say, other ingredients commonly employed in these type products may also be incorporated into the present compositions. These would include other antibiotics like penicillin, streptomycin, polymixin B sulfate, neomycin, oleandomycin, and so forth, as well as the steroid hormones such as cortisone, hydrocortisone, prednisolone, etc., in addition to buffering agents and other stabilizers such as ascorbic acid, aspartic acid, citric acid, monoethanolamine, diethanolamine and triethanolamine, etc., thioglycerol, and the non-toxic alkali metal and alkaline-earth metal formaldehyde sulfoxylates. Further, glycerine and water are typical of other solvents which may also be used in this connection provided that are not used alone, i.e., as the main component of the solvent mixture. As a matter of fact, as high as up to about 15–20% by weight of water may be incorporated into these compositions, if so desired.

The process employed for preparing the novel compositions of this invention essentially involves dissolving the tetracycline-type antibiotic component in the desired polyol solvent system in accordance with standard pharmaceutical practice and procedure. Care should be taken throughout the operation of this step to ensure that little or no aeration of the reaction mixture occurs so as to keep any possible contamination due to oxidative decomposition at a minimal. In the case of the preferred tetracycline-type antibiotic complex salts, the preformed chosen salt may be added to the mixture as such or else prepared in situ by simply dissolving the antibiotic in the polypropylene glycol solvent system and then adding an aqueous or polyol solution of the metal salt to the mixture. In either case, the temperatures employed to effect such a mixture will vary anywhere from about 20° C. up to about 55° C. Generally speaking, the pH conditions throughout such an operation (when water is present in the solvent system) are controlled by the addition of a base to the mixture so as to maintain said pH within the range of from about 5.0 up to about 10, and preferably in the range of pH 7.0-9.0. This is especially important in those cases where the antibiotic complex salts are formed in situ, in addition to ensuring a maximum optimum stability for the final product.

The compositions prepared according to the present invention have all been found to be stable as regards both color and potency requirements for over long periods of time when tested both at room temperature (~25° C.) as well as at higher temperatures (37-50° C.) under accelerated conditions. For instance, in tests that were designed and specifically conducted to show the greatly improved color stability of various oxytetracycline metal chelate solutions as caused by the specific addition thereto of polypropylene glycol, average molecular weight 8200, on a 10% by weight per volume basis, it was found that the following quantitative information could be obtained:

| Substance | Initial Value | Optical Density at 500 mμ | | |
|---|---|---|---|---|
| | | 2 wks. at 25° C. | 2 wks. at 37° C. | 2 wks. at 50° C. |
| Test soln. | 0.412 | 0.560 | 0.570 | 0.588 |
| Control | 0.392 | 0.762 | 0.740 | 0.760 |

The test solution in the above table consisted of a 50 mg. per ml. solution of a magnesium oxytetracycline complex dissolved in propylene glycol, which also contained 0.5% by weight per volume of sodium formaldehyde sulfoxylate plus 1 mg. per ml. of aspartic acid and 5 mg. per ml. of citric acid, together with the added Pluronic F68 (polypropylene glycol, 8200). The control was prepared under the same identical conditions, but lacked the added polypropylene glycol content. The results obtained in this manner clearly demonstrate and show the marked optical superiority of the test solution as compared to the control.

These new therapeutic compositions are particularly useful for parenteral and topical administration, although they may also be used orally as well. For purposes of parenternal administration, intramuscular and subcutaneous type dosage forms may be prepared in accordance with standard pharmaceutical practice, as may injectable solutions which are suitable for intravenous administration. In addition, it is also advantageous to administer these compositions topically in the form of ointments and salves so as to treat such conditions of the skin as wounds, cuts, sores and abrasions, etc.

This invention is further illustrated by the following examples, which are not to be construed in any way as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A pharmaceutical composition was prepared by blending together the following ingredients in the manner hereinafter indicated:

| | Gm./500 g. |
|---|---|
| Oxytetracycline hydrochloride | 16.75 |
| Magnesium chloride hexahydrate | 9.00 |
| Monoethanolamine | 8.10 |
| Pluronic L62 | 213.50 |
| Polyoxyethylene (20) cetyl ether | 50.00 |
| Pluronic F68 | 150.00 |
| Water, distilled | 50.00 |
| Sodium formaldehyde sulfoxylate | 2.65 |

The Pluronic F68 and the polyoxyethylene (20) cetyl ether were melted together at 70-80° C. The Pluronic L62 was then mixed with 45 g. of water and the magnesium chloride hexahydrate was subsequently dissolved into this mix. At this point, the oxytetracycline hydrochloride was added with stirring while the entire mixture was blanketed under a nitrogen atmosphere. The pH of the resulting aqueous system was then measured and adjusted to pH 8.5 with the monoethanolamine. The sodium formaldehyde sulfoxylate was next added to the mixture after it had first been dissolved in the remainder of the batch water, and the resulting aqueous solution was stirred throughly while the previously prepared melt was slowly dropped in at a temperature slightly above 55° C. Stirring was then continued until the resulting mass attained room temperature (~25° C.), at which point the resultant cooled batch was passed through a three-roll mill to eliminate any grainy appearance on the part of the ointment so produced. This product remained stable over long periods of time as evidenced by the data presented below and failed to become decolorized throughout this entire period, unlike similar ointments prepared using polyethylene glycol as the sole glycol solvent instead:

| | Bioassay (γ/mg.) | Chem. Assay, (mg./g.) |
|---|---|---|
| Initial assay | 31.3 | 32.7 |
| 12 weeks at 37° C | 29.2 | 31.8 |

*Example II*

A pharmaceutical composition was prepared by blending together the following ingredients in the manner hereinafter indicated:

| | Gm./1000 g. |
|---|---|
| Oxytetracycline hydrochloride | 36.870 |
| Magnesium chloride hexahydrate | 13.428 |
| Monoethanolamine (approx.) | 16.597 |
| Sodium formaldehyde sulfoxylate | 5.290 |
| Water, distilled | 100.000 |
| Polyethylene glycol 400 | 547.815 |
| Polyethylene glycol 6000 | 80.00 |
| Pluronic F68 | 200.00 |

The polyethylene glycol 400 was first weighed into a vessel equipped with a stirring motor while blanketed under a nitrogen atmosphere. The magnesium chloride hexahydrate and the sodium formaldehyde sulfoxylate were each both separately dissolved in 40 g. of water. At this point, the oxytetracycline hydrochloride was added to the polyethylene glycol with stirring and after a five minute period had elapsed, the aqueous magnesium chloride solution was added to the stirred glycol mixture followed by 10 g. of additional water that had been used to wash the magnesium chloride flask. The pH of the aqueous system which resulted was then measured after five minutes of additional stirring at room temperature and adjusted to pH 8.5 with the monoethanolamine. The aqueous sulfoxylate solution was then added to the mixture with stirring at this point, followed by the addition of any remaining water from the original batch requirement after it had first been used as wash for the sulfoxylate-containing flask; again, stirring was continued as before.

In the meanwhile, the polyethylene glycol 6000 was weighed out and then melted at the lowest temperature possible (this usually was about 70° C.). The Pluronic F68 was also weighed out and added to the foregoing melt, using some heat to melt the pluronic. At this point, the combined glycol system was heated to 55° C. and added with stirring to the previously prepared aqueous system which had first been brought to 40° C. Upon completion of this step, the reaction mixture was stirred until the resulting ointment became cool at which point, it was subsequently passed through a three-roll mill. This ointment remained stable over long periods of time and failed to lose its original bright yellow color, unlike similarly prepared oxytetracycline ointment bases lacking the polypropylene content, which turned black instead.

*Example III*

A pharmaceutical composition was prepared by blending together the following ingredients in the proportions by weight specified:

| | Gm./4000 g. |
|---|---|
| Oxytetracycline hydrochloride | 113.99 |
| Magnesium chloride hexahydrate | 62.47 |
| Monoethanolamine ml | 49.00 |
| Sodium formaldehyde sulfoxylate | 8.00 |
| Pluronic F68 | 1480.00 |
| Water, distilled | 720.00 |
| Propylene glycol | 1843.00 |

The viscous oxytetracycline liquid concentrate so obtained was found to possess an enhanced color stability attributable solely to the polypropylene glycol (Pluronic F68) content of the mixture. Stability data on the active ingredient itself is reported as follows:

| | Bioassay ($\gamma$/mg.) | Chem. Assay (mg./ml.) |
|---|---|---|
| Initial assay | 24.1 | 27.7 |
| 3 weeks at 50° C | 23.1 | 24.3 |
| 6 months at 37° C | 23.7 | 25.5 |

*Example IV*

A pharmaceutical composition was prepared by blending together the following ingredients in the proportions by weight specified below:

| | Gm./500 g. |
|---|---|
| Oxytetracycline hyrdochloride | 16.75 |
| Magnesium chloride hexahydrate | 9.00 |
| Monoethanolamine ml | 7.50 |
| Hydrocortisone | 2.50 |
| Pluronic L62 | 160.50 |
| Pluronic F68 | 150.00 |
| Propylene glycol | 50.00 |
| Polyoxyethylene (20) cetyl ether | 50.00 |
| Sodium formaldehyde sulfoxylate | 2.65 |
| Water, distilled | 50.00 |

The oxytetracycline-hydrocortisone ointment so obtained was found to possess an enhanced color stability attributable solely to the polypropylene glycol (Pluronic L62 and F68) content of the mixture. Stability data on the active ingredients themselves is given below as follows:

| | Oxytetracycline | | Hydrocortisone Chem. Assay (mg./g.) |
|---|---|---|---|
| | Bioassay ($\gamma$/mg.) | Chem. Assay (mg./g.) | |
| Initial assay | 22.9 | 33.8 | 5.11 |
| 3 weeks at 37° C | 32.3 | 32.6 | 3.80 |
| 12 weeks at 37° C | 29.9 | 32.00 | 3.24 |

*Example V*

A pharmaceutical composition was prepared by blending together the following ingredients in the proportions by weight specified below:

| | Gm./500 g. |
|---|---|
| Oxytetracycline hydrochloride | 16.75 |
| Magnesium chloride hexahydrate | 9.00 |
| Sodium formaldehyde sulfoxylate | 2.65 |
| Polymixin B sulfate (10,000 u./g.+10$\gamma$/g.) | 0.745 |
| Pluronic L62 | 270.50 |
| Pluronic F68 | 150.00 |
| Polyoxyethylene (20) cetyl ether | 50.00 |
| Water | 50.00 |
| Monoethanolamine ml | 8.00 |

The oxytetracycline-polymixin ointment so obtained was found to possess an enhanced color stability attributable solely to the polypropylene glycol (Pluronic L62 and Pluronic F68) content of the mixture. Stability data on the active ingredients themselves is reported as follows:

| | Oxytetracycline | | Polymixin Bioassay (u./g.) |
|---|---|---|---|
| | Bioassay ($\gamma$/mg.) | Chem. Assay (mg./g.) | |
| Initial assay | 33.9 | 34.9 | 9,000 |
| 3 weeks at 37° C | 32.9 | 34.2 | |
| 12 weeks at 37° C | 30.4 | 34.5 | 6,000 |

*Example VI*

A pharmaceutical composition was prepared by blending the following ingredients together in the proportions by weight indicated below:

| | Gm./500 g. |
|---|---|
| Oxytetracycline hydrochloride | 16.75 |
| Magnesium chloride hexahydrate | 9.00 |
| Sodium formaldehyde sulfoxylate | 2.65 |
| Neomycin sulfate | 5.50 |
| Pluronic L62 | 208.00 |
| Pluronic F68 | 150.00 |
| Polyoxyethylene (20) cetyl ether | 50.00 |
| Water, distilled | 50.00 |
| Monoethanolamine ml | 9.00 |

The oxytetracycline-neomycin ointment so obtained was found to possess an enhanced color stability attributable solely to the polypropylene glycol (Pluronic L62 and F68) content of the mixture. Stability data on the active ingredients themselves is presented below:

| | Oxytetracycline | | Neomycin Bioassay ($\gamma$/mg.) |
|---|---|---|---|
| | Bioassay ($\gamma$/mg.) | Chem. Assay (mg./g.) | |
| Initial assay | 32.4 | 33.8 | 9,290 |
| 3 weeks at 37° C | 33.0 | 33.92 | 9,407 |
| 12 weeks at 37° C | 31.8 | 23.4 | 8,870 |

*Example VII*

A pharmaceutical composition was prepared by blending together the following ingredients in the proportions by weight indicated below:

| | Gm./1500 g. |
|---|---|
| Oxytetracycline hydrochloride | 55.307 |
| Polymixin B sulfate | 3.072 |
| Hydrocortisone | 20.255 |
| Monoethanolamine ml | 25.50 |
| Sodium bisulfite | 7.50 |
| Water, distilled | 150.00 |
| Polyethylene glycol 400 | 810.00 |
| Polyethylene glycol 6000 | 120.00 |
| Pluronic F68 | 300.00 |

The oxytetracycline-polymixin-hydrocortisone ointment so obtained was found to possess an enhanced color stability attributable solely to the polypropylene glycol (Pluronic F68) content of the mixture. Further, it remained stable over long periods of time both with respect to both its color as well as to its biological activity.

*Example VIII*

The procedure of Example I is repeated employing tetracycline hydrochloride as the antibiotic of choice in place of oxytetracycline on an equimolar basis, with equally comparable results being obtained. In like manner, the use of chlortetracycline, 6-demethylchlortetracycline, 6-deoxytetracycline and 6-demethyl-6-deoxytetracycline in place of oxytetracycline affords similar results in each case.

*Example IX*

The procedure of Example I is repeated employing 5.75 g. of calcium acetate monohydrate in place of the magnesium chloride component. In this way, the corresponding calcium oxytetracycline complex is formed in situ, but the results obtained are otherwise the same as reported previously in the aforementioned example.

In like manner, the use of the zinc chloride (2.97 g.) and aluminum chloride hexahydrate (25.54 g.) in place of the magnesium chloride of the previously described example affords the corresponding known complexes of oxytetracycline which behave in these compositions in the same way as does the parent antibiotic base.

*Example X*

The procedure described in Example I is followed employing tetracycline as in Example VIII (16.22 g.) as the antibiotic of choice and 11 g. of anhydrous calcium chloride in place of the magnesium chloride component. The results obtained in this particular case as regards both color and potency stability are substantially the same as reported in the first example. In like manner, the use of aluminum chloride hexahydrate (24 g.) in place of the aforesaid magnesium chloride component affords the corresponding known aluminum tetracycline complex in situ, with substantially comparable results also being obtained as regards both the two aforementioned stability requirements.

*Example XI*

A pharmaceutical composition was prepared by blending together the following ingredients in the manner hereinafter indicated:

| | Gm./1000 g. |
|---|---|
| Oxytetracycline hydrochloride | 38.8714 |
| Polymixin B sulfate (6835 u./g.) | 2.048 |
| Magnesium chloride hexahydrate | 13.5036 |
| Sodium bisulfite | 5.000 |
| Monoethanolamine | 17.1987 |
| Water | 90.426 |
| Pluronic P75 | 830.000 |

The polymixin B sulfate was dissolved in 50 ml. of water, while the magnesium chloride hexahydrate and sodium bisulfite were both separately dissolved in the remaining amount of said water. The Pluronic P75 was then melted in a water bath and stirred under a nitrogen atmosphere until the temperature of the melt reached 55° C. At this point, oxytetracycline hydrochloride, the magnesium chloride solution previously prepared, monoethanolamine and the sodium bisulfite solution previously prepared were all added to the stirred melt in successive portions, and the pH of the resulting mixture was subsequently adjusted to 8.5. The polymixin B sulfate solution was then added with stirring at 50° C. and the final mixture maintained under these conditions for 1.5 hours so as to ensure complete solution before cooling to room temperature. The oxytetracycline-polymixin ointment so obtained was found to possess an enhanced color stability attributable solely to the polypropylene glycol (Pluronic P75) content of the mixture.

*Example XII*

A pharmaceutical composition was prepared by blending together the following ingredients in the manner hereinafter indicated:

| | Gm./1000 g. |
|---|---|
| Oxytetracycline hydrochloride | 36.8714 |
| Polymixin B sulfate | 2.048 |
| Hydrocortisone | 10.000 |
| Magnesium chloride hexahydrate | 13.5036 |
| Sodium bisulfite | 5.000 |
| Monoethanolamine | 17.1907 |
| Water | 85.4261 |
| Pluronic P75 | 830.000 |

The Pluronic P75 was first melted via a steam bath and then cooled down with stirring at 60° C. while under a nitrogen atmosphere. The hydrocortisone was then added to the melt with stirring and agitation of the mixture was continued until said ingredient was well dispersed therein. At this point (the temperature of the mixture was now 55° C.), the oxytetracycline hydrochloride, magnesium chloride hexahydrate dissolved in some of the above water, the monoethanolamine and sodium bisulfite in the remainder of the above water minus 50 ml. were slowly added thereto in successive portions with constant agitation being maintained throughout said addition. The polymixin B sulfate was then added in 50 ml. of water and the pH of the resulting mixture was subsequently adjusted to pH 8.5. Stirring was thereafter maintained at 50° C. until the polymixin component was completely dissolved. Upon cooling to room temperature, the resulting oxytetracycline-polymixin-hydrocortisone ointment was found to be a product of enhanced color stability. This is attributed solely to the polypropylene glycol (Pluronic P75) content of the mixture.

*Example XIII*

A pharmaceutical composition was prepared by blending together the following ingredients in the manner hereinafter indicated:

| | Gm./1000 g. |
|---|---|
| Oxytetracycline hydrochloride | 36.8714 |
| Magnesium chloride hexahydrate | 13.5036 |
| Sodium formaldehyde sulfoxylate | 5.2900 |
| Water | 90.000 |
| Monoethanolamine ml | 18.00 |
| Pluronic P75 | 837.1363 |

The Pluronic P75 was first melted at 70-80° C., while the magnesium chloride hexahydrate and the sodium formaldehyde sulfoxylate were both separately dissolved in water as in the previous example (except that sodium bisulfite was used therein instead of the sulfoxylate). While under a nitrogen blanket, the oxytetracycline hydrochloride was stirred into the cooled melt at 50° C. and when it was well dispersed therein, the aqueous magnesium chloride solution was next added slowly to the mixture. The monoethanolamine and then the sodium bisulfite solution were next added with stirring, while the temperature of the mixture rose to 53-54° C. After cooling down to 50° C. again, stirring was continued for an additional hour while maintaining the temperature of the final composition at this point (50° C.). The resulting oxytetracycline ointment was then cooled to room temperature and found to be a product of enhanced color stability. This is attributed solely to the polypropylene glycol (Pluronic P75) content of the mixture.

Example XIV

A pharmaceutical composition was prepared by blending together the following ingredients in the manner hereinafter indicated:

| | Gm./1000 g. |
|---|---|
| Oxytetracycline hydrochloride | 36.8714 |
| Magnesium chloride hexahydrate | 13.5036 |
| Sodium bisulfite | 5.000 |
| Hydrocortisone | 10.000 |
| Water | 85.000 |
| Monoethanolamine _____ml | 18.00 |
| Pluronic P75 | 832.4263 |

The Pluronic P75 was first melted at 70–80° C. on a steam bath, after which the hydrocortisone was stirred in while the mixture was blanketed under a nitrogen atmosphere. Stirring was then continued until the temperature dropped to 50° C., at which point the oxytetracycline hydrochloride was added to the mixture. Stirring was then continued as before and when the oxytetracycline had become completely dispersed, the magnesium chloride hexahydrate and sodium bisulfite, which had both been first separately dissolved in water as in Example XII, were next added to the mixture, as was the monoethanolamine. The order of addition in this particular case was actually the magnesium chloride solution first, then the monoethanolamine and then the sodium bisulfite solution. Stirring was again continued at 50° C. until complete solution had been effected and this, in turn, required an additional hour to an hour and a half. The resulting oxytetracycline-hydrocortisone ointment so obtained was then cooled to room temperature and found to be a product of enhanced color stability. The latter quality was attributed solely to the polypropylene glycol (Pluronic P75) content of the mixture.

What is claimed is:

1. A pharmaceutical composition comprising a tetracycline antibiotic as the essential active ingredient, wherein the antibiotic is selected from the group consisting of the magnesium, calcium and aluminum complexes of tetracycline having a molar ratio of metal ion to tetracycline that is about 3:1, and the magnesium, calcium, aluminum and zinc complexes of oxytetracycline having a molar ratio of metal ion to oxytetracycline that is in the range of about 1:3 to about 3:1; and as a pharmaceutically acceptable carrier therefor, a polypropylene glycol having an average molecular weight that is in the range of from about 2200 up to about 8200.

2. A composition as claimed in claim 1 wherein the carrier also contains up to about 65% by weight of a polyethylene glycol.

3. A composition as claimed in claim 1 wherein the carrier also contains up to about 50% by weight of propylene glycol.

4. A pharmaceutical composition suitable for topical administration, comprising a magnesium oxytetracycline having a molar ratio of metal ion to oxytetracycline that is in the range of from about 1:3 up to about 3:1 and a pharmaceutically acceptable polyhydric alcohol as carrier therefor, said carrier containing at least one polypropylene glycol in the average molecular weight range of from about 2200 up to about 8200.

5. A composition as claimed in claim 4 wherein the pharmaceutically acceptable polypropylene glycol employed therein has an average molecular weight that is about 8200.

6. A composition as claimed in claim 4 wherein the pharmaceutically acceptable polypropylene glycol employed therein has an average molecular weight that is about 4000.

7. A composition as claimed in claim 4 which also contains hydrocortisone.

8. A composition as claimed in claim 4 which also contains polymixin B sulfate.

9. A composition as claimed in claim 4 which also contains neomycin.

10. A method for improving the color stability of a tetracycline antibiotic, which comprises contacting the antibiotic with at least one polypropylene glycol that is in the molecular weight range of from about 2200 up to about 8200 at a temperature that is in the range of from about 20° C. up to about 55° C., and thereafter recovering the so-treated antibiotic.

11. A method as claimed in claim 10 wherein the antibiotic is oxytetracycline.

12. A method as claimed in claim 10 wherein the antibiotic is tetracycline.

References Cited in the file of this patent

UNITED STATES PATENTS

| 2,854,378 | Buckwalter | Sept. 30, 1958 |
| 2,975,099 | Goyan et al. | Mar. 14, 1961 |
| 2,984,686 | Blackwood et al. | May 16, 1961 |
| 3,009,956 | Noseworthy | Nov. 21, 1961 |
| 3,017,323 | Gordon et al. | Jan. 16, 1962 |
| 3,026,248 | Noseworthy et al. | Mar. 20, 1962 |

FOREIGN PATENTS

| 817,182 | Great Britain | July 29, 1959 |